United States Patent [19]

Avery

[11] 4,034,249

[45] July 5, 1977

[54] COMMUTATOR ROUNDING BRUSH

[75] Inventor: Ralph W. Avery, Erie, Pa.

[73] Assignee: General Electric Company, Erie, Pa.

[22] Filed: Aug. 5, 1976

[21] Appl. No.: 711,941

[52] U.S. Cl. .................................. 310/253; 310/228

[51] Int. Cl.² .................. H02K 13/00; H01R 39/56

[58] Field of Search .......... 310/228, 229, 230, 241, 310/248, 249, 251, 252, 253

[56] References Cited

UNITED STATES PATENTS

| | | | |
|---|---|---|---|
| 1,807,794 | 6/1941 | Munday | 310/228 |
| 2,105,038 | 1/1938 | Helwig | 310/228 |
| 2,656,475 | 10/1953 | Diehl et al. | 310/253 |
| 2,739,255 | 3/1956 | Shobert et al. | 310/228 |
| 2,918,591 | 12/1959 | Lyddon | 310/228 |
| 3,173,045 | 3/1965 | Oliver et al. | 310/228 |
| 3,358,166 | 12/1967 | Nolan | 310/228 |
| 3,392,295 | 7/1968 | Sebok | 310/228 |

*Primary Examiner*—Gerald Goldberg
*Attorney, Agent, or Firm*—A. S. Richardson, Jr.

[57] ABSTRACT

An electrical contact brush having interposed in a central longitudinal slot an abrasive element which frictionally contacts the commutator surface at crests where the radius of curvature of the commutator is less than that of a concave contact surface preformed at the distal end of the brush but which does not contact the commutator at valleys where the radius of curvature of the commutator is greater than that of the brush contact surface, said element in operation mechanically reducing the average radius of the commutator at a rate faster than the rate at which the commutator surface is electrically eroded, thereby tending to maintain a true cylindrical commutator surface with uniform wear characteristics.

19 Claims, 7 Drawing Figures

Fig. 1
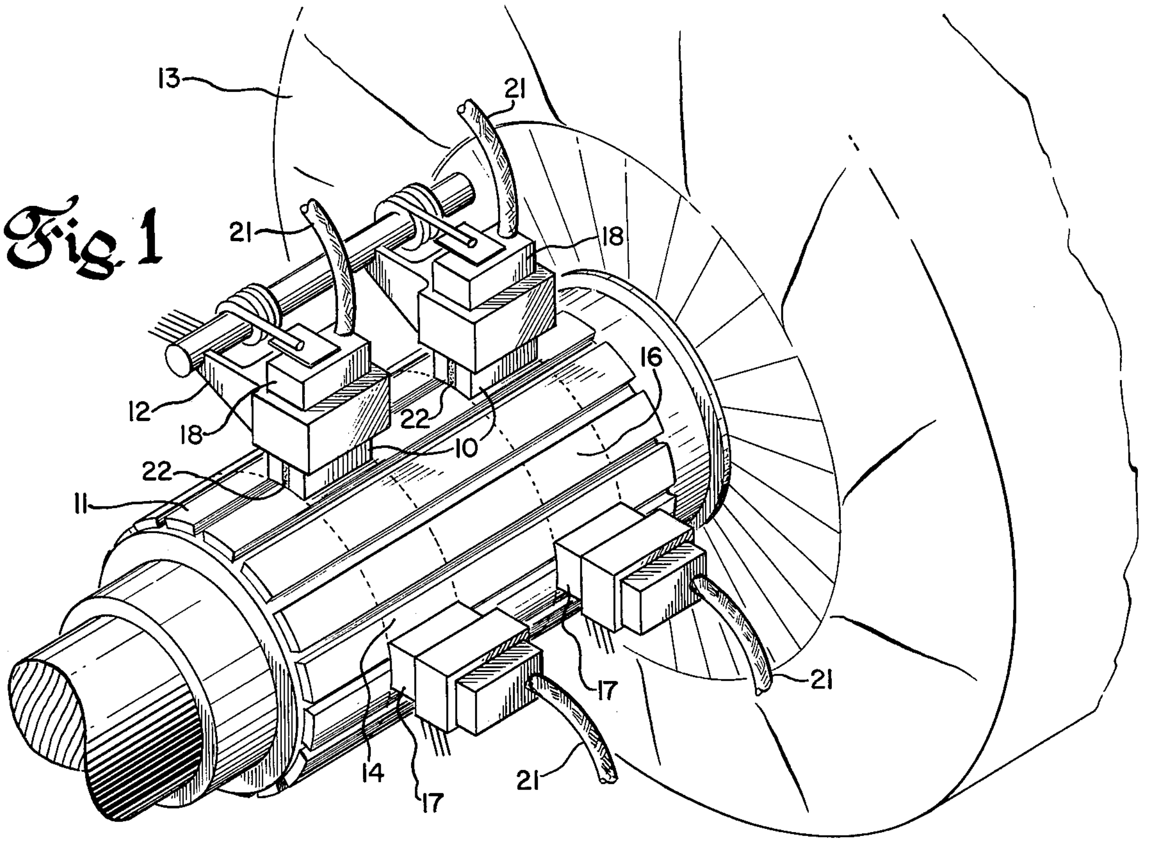
Fig. 2
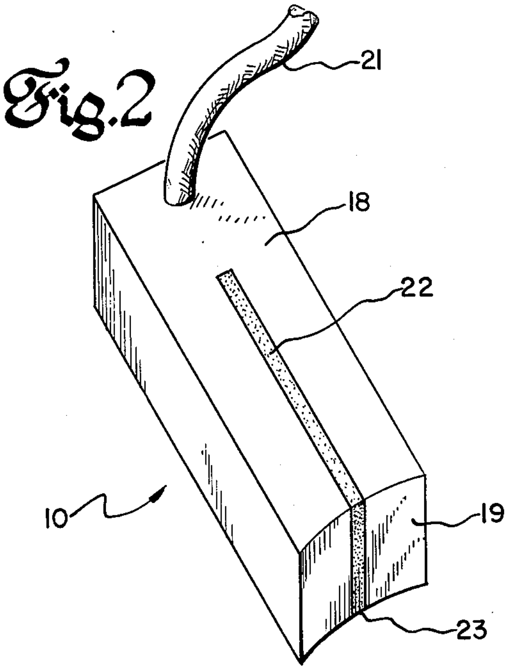
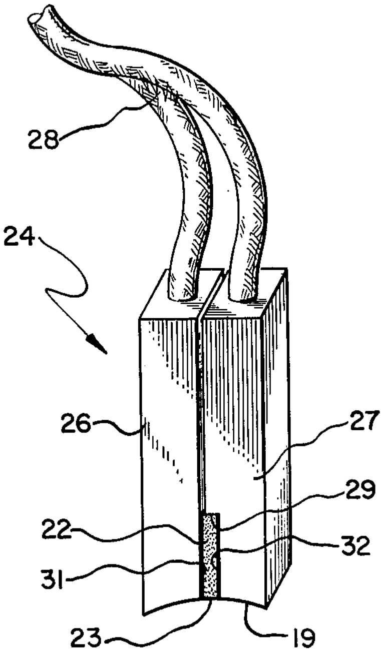
Fig. 3

COMMUTATOR ROUNDING BRUSH

BACKGROUND OF THE INVENTION

This invention relates generally to electrical brushes for use in dynamoelectric machines, and more particularly to brushes for automatically maintaining a uniform commutator contact surface.

In dynamoelectric machines such as motors, generators, or alternators having brushes making electrical current conductive contact with a radial or cylindrical surface of a conductive structure such as a commutator or slip ring, the moving contact between the elements causes mutual wearing; firstly, by simple mechanical frictional wearing or abrasion; and secondly, by electrical erosion.

Mechanical wear is affected by such things as contact area, contact pressure, shock, vibration, and non-uniformity. To reduce mechanical wear of the conductive structure, the brushes are made of a softer material so that they are the principal wearing element rather than the commutator.

The major cause of wear on the conductive structure is that of electrical erosion. Especially susceptable to such action is a heavy-duty dynamoelectric machine operating with high current such as in the case of a locomotive traction motor. The electrical wearing which normally occurs, tends to erode material from the surface of the conductive structure, such as the commutator or slip ring along the contact path of the brush on the moving surface. This path tends to become rough and pitted due to even normal arcing over the area of instantaneous contact. Once begun, this roughening increases the arcing which, in turn, increases the rate of roughness increase in a mutually causative and progressively rapidly deteriorating fashion.

In addition to the pitting action, certain commutators develop a wavy pattern of wear, often characterized by four or six flat spots or dips. When this occurs, the higher portions on the circumference will often develop a thin, uniform and conductive film. Little or no arcing occurs on these high portions, but on the adjacent low portions the arcing is increased and a thick, non-conductive film is developed thereon which further inhibits conduction. Thus the commutator is progressively worn in a manner which causes it to be non-cylindrical in form. Other causes of non-uniformity of the commutator surface includes that of mechanical shifting caused by stresses on the commutator. The result is a relative lowering or raising of individual commutator bars which causes a variation in both electrical and mechanical erosion on the surface of the commutator.

A non-uniform commutator or slip ring surface will increase the mechanical wear of both the brushes and the conductive structure. If the non-uniformity is severe enough, chattering, or vibration of the brushes occurs and will eventually result in failure of the brushes.

Accordingly, during the life of such machines, periodic servicing is required to replace brushes and to dress the contact surface of the moving structure. The commutator is commonly trued to form by removing it from the machine and turning it in a lathe. Where the cost of removal is too great for such methods, some form of portable grinding wheel of lathe-turning tool is used without removal of the structure from the machine. In either case, the machine must be idle for a considerable length of time.

A method of automatically resurfacing the commutator during normal operation of the machine was devised wherein an abrasive brush, or a brush containing an abrasive material throughout its structure, was installed in the standard brushholder. This could be either a temporary arrangement, or a continuous arrangement wherein the abrasive element performed the normal function of a standard brush. Both arrangements tended to cause excessive wear of the commutator and neither arrangement provided corrective action to out-of-round conditions, since high portions were not selectively worn at a greater rate than low portions. In fact, mechanical vibration and brush response usually deepened any existing low portions of the commutator and thereby increased the roughness.

An alternate arrangement provided for automatic periodic abrasive wear on the commutator by the interpositioning in longitudinal spaced relationship of transverse discontinuities between successive like portions in the brush structure. Such an arrangement thus conserves armature material by not continually abrading the surface, but as in the afore-mentioned methods, no corrective action to out-of-round conditions is afforded.

It is, therefore, an object of this invention to provide a new and improved electrical brush that will substantially reduce periodic servicing and machine down time.

Another object of this invention is the provision for electrical brushes which significantly reduce electrical erosion of the commutator used in combination therewith.

Yet another object of this invention is the provision for the automatic self-rounding of a machine commutator.

Still another object of this invention is the provision for selective abrasion of a commutator surface to produce and maintain a round commutator profile.

A further object of this invention is the provision for an electrical brush which is economical to manufacture and functional and durable in use.

These objects and other features and advantages become more readily apparent upon reference to the following description when taken in conjunction with the appended drawings.

SUMMARY OF THE INVENTION

This invention relates to an electrical brush construction wherein a thin abrasive element or wafer is interposed in a longitudinal slot of a standard brush. The abrasive element terminates at the brush contact surface and forms a central portion thereof, extending transversely across the path of brush contact on the commutator surface. The contact surface of the brush has a concave profile conforming to the average radius of the commutator. Thus the abrasive element frictionally contacts the commutator surface at high spots where the radius of curvature of the commutator is less than average but does not contact the commutator at low spots where the radius is greater than average.

The selective abrasive action maintains the mechanical abrasion at a rate exceeding that of the early stages of electrical erosion, thereby reducing electrical erosion and tending to maintain the commutator surface in a substantially round profile. The automatic rounding of the commutator results in longer brush-life and increases the interval between re-surfacings of the commutator wear surface. Servicing and down-time of the machine is thus greatly reduced.

Though the invention is hereinafter specifically disclosed and described in forms of a rotating commutator as a conductor structure with a stationary brush longitudinally slidably guided and biased into contact therewith, it is to be understood that the disclosed features may have advantages in other types of brush rigging and in other environments wherein an electric conductive contact is made between relatively movable brush and conductor elements.

BRIEF DESCRIPTION OF THE DRAWINGS

FIG. 1 is a perspective view of the electrical brushes as installed in accordance with the preferred embodiment.

FIG. 2 is a perspective view of the preferred embodiment of the brush.

FIG. 3 shows a normal duplex, two-wafer brush modified with the abrasive element of the preferred embodiment.

DESCRIPTION OF THE PREFERRED EMBODIMENT

Figure 4:
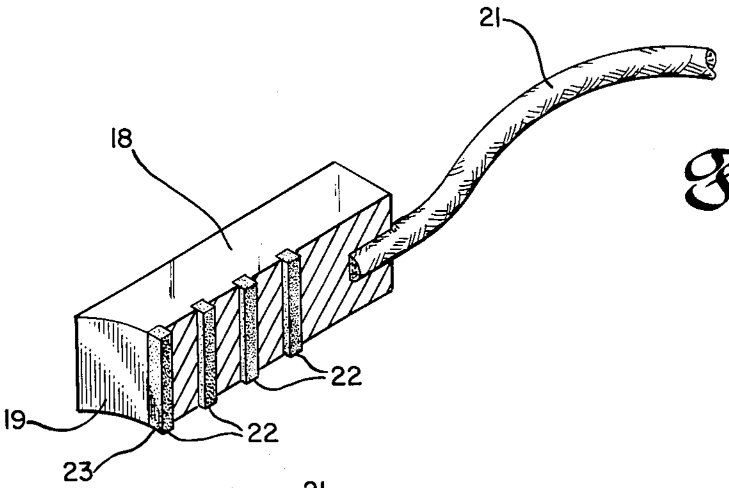
FIG. 4 is a perspective sectional view of a modified embodiment of the invention.

Reference is now made to FIG. 1 which shows a pair of the subject brushes 10 held in operational cooperation with a commutator 11 by a standard brushholder arrangement 12. The commutator 11 forms part of a rotor of a dynamoelectric machine 13, such as a motor or generator.

It should be understood that the invention will be described in terms of use with a commutator, but it may just as well be used with other rotatable conductive parts, such as slip rings.

The machine shown in FIG. 1 is of the type having outer 14 and inner 16 brush wear paths with the brushes 10 serving as positive poles and standard brushes 17 serving as negative poles. Any combination of brushes may be used, but the preferred arrangement locates one of the subject brushes in each wear path so as to maintain the surface of the wear path in the desired round and smooth condition. The construction of the preferred embodiment of the brush 10 is shown in FIG. 2. The brush body 18 is composed of a carbonaceous conducting material and has a concave contact surface 19 against which the commutator slides as it rotates. The brush is biased toward the exposed convex surface of the electroconductive segments (usually copper bars) of the commutator by suitable springs (see FIG. 1). The usual shunt wire or pigtail 21 is connected to the outer end of the brush.

Disposed longitudinally in the brush body 18 is a thin abrasive element or wafer 22 extending to the contact surface 19 with its one end 23 forming a central portion thereof. This central abrasive portion has a relatively small area, less than approximately 40 per cent and preferably only 20 per cent of the total area of the contact surface 19. As is best seen in FIG. 2, it extends entirely across the brush contact surface generally parallel to and midway between the leading and trailing edges of the brush so as to cover the entire wear path as the commutator is rotated. The manner in which the abrasive element 22 is secured within the brush body 18 is not a critical factor in the invention. A preferred method of manufacture calls for a longitudinal slot to be machined in the body 18 with the abrasive wafer being inserted therein and secured by a common adhesive.

For proper operation of the subject brush, it is important to give its contact surface 19 a concave profile, as is shown in FIG. 2, prior to using the brush in its intended setting. This can be conveniently accomplished, for example, by a grinding process wherein the brush is put in a suitable fixture and its contact surface is ground to the desired shape by a grinding wheel, or by a sanding process wherein the brush is installed in the brushholder on a dynamoelectric machine whose commutator is then manually oscillated with a sheet of sand paper between it and the contact surface. Regardless of the process used to make the contact surface concave, the preformed concavity preferably has a radius of curvature approximately the same as or slightly less than the average radius of curvature of the exposed convex surface of the commutator of the machinery in which the brush will be utilized.

FIG. 3 illustrates an alternative embodiment in which a commonly used duplex, two-wafer brush 24 has been modified in accordance with the present invention. The normal arrangement of such a brush comprises a pair of parallel aligned, unattached brush members 26 and 27 having a bifurcated pigtail 28 attached to their tops. The slot 29 into which the abrasive element 22 is inserted is formed by the removal of a portion of one wafer 27. It may just as well be formed by the removal of equal portions from both wafers, thereby placing the element 22 in a symmetrically central position in the brush. The element 22 is secured in the brush 24 by an adhesive applied to the opposite sides 31 and 32 of the slot 29 to form an integral unit. A concave profile is preformed in the contact surface 19, and normal operation of the brush 24 functions similarly to the brush 10 shown in FIG. 2, with the abrasive element 22 causing selective mechanical wear of the commutator surface as will hereinafter be described. As the brush 24 wears down to a point where the element 22 is depleted, the brush then assumes the nature of a normal duplex two-wafer brush for subsequent use. The length of the abrasive wafer 22 is selected to provide the desired performance characteristics.

Another alternative would be to longitudinally space a plurality of shorter abrasive wafers 22 in the body 18 of the brush, such as is shown in FIG. 4, thereby providing during normal wear of the brush several regions wherein the contact surface 19 is free of any abrasive element. This design would provide for periodic abrasive action as opposed to continual action, thereby possibly conserving copper on the commutator wear surface. However, the manufacture of such a brush would be somewhat more complicated, and any quantity of metal conserved may be negligible when considering the controlled wear characteristics of the continuous wafer arrangement as will hereinafter be described.

The composition of the abrasive wafer 22 is a mixture of a base material, such as carbon, and an abrasive material mixed in certain proportions with the base material. The base material is not necessarily an electrical conductor but it is preferably so. The abrasive material must be of consistency such that a certain amount of the commutator surface is worn away by friction therewith; however, it must not be so coarse as to gouge the surface or wear an excessive amount away. On the other hand, it should not be so fine as to polish the commutator surface too smoothly and thereby prevent the formation of a very thin carbon film that is beneficial to the performance of the standard brushes 17 located in the same wear path (14 or 16 in FIG. 1). Although a number of other abrasives may be acceptable for use, a preferred one has been found to be silicon carbide having 600-grit size particles. Preferably the proportion of abrasive material in the mixture is approximately 15% when silicon carbide is used.

Figure 5:
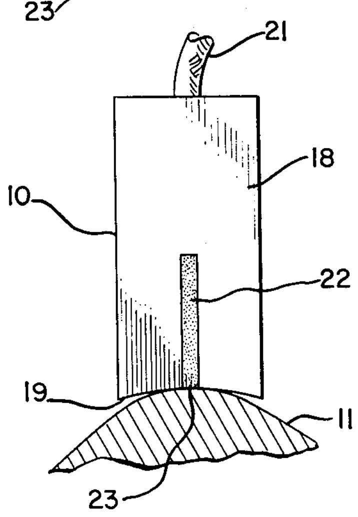
FIG. 5 is a schematic showing of the interrelationship between the brush wear surface and the commutator surface at a high point on the commutator surface.
Figure 6:
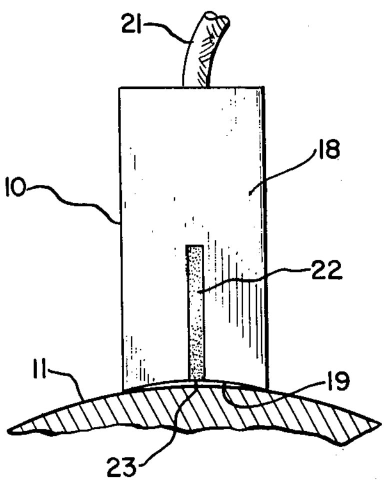
FIG. 6 is a schematic view thereof at a low point on the commutator surface.

The contact relationship between the brush contact surface 19 and the exposed surface of the commutator wear path 14 is illustrated in FIGS. 5 and 6.

The actual radius of curvature of the concave brush contact surface is determined by its wear, and the surface will wear to conform to the average radius of curvature of the commutator. When a high spot on the commutator surface passes this contact surface, as shown in FIG. 5, the radius of curvature of the former is less than that of the latter, and the central abrasive portion 23 of the brush contact surface 19 will frictionally engage the high spot and tend to wear it off. When a low spot on the commutator surface passes this contact surface, as shown in FIG. 6, the radius of curvature of the former is greater than that of the latter, and only the leading and trailing sides of the carbon portion of the contact surface 19 will engage the commutator surface.

The two conditions shown in FIGS. 5 and 6 represent the extreme deviations from uniform commutator profile. Generally, the surface condition of the commutator varies therebetween, and the mating relationship with the brush contact surface 19 is accordingly varied to provide varying degrees of contact with the end 23 of the central abrasive element 22 while the brush itself remains continuously in contact with the commutator. The amount worn from the commutator surface, at any point thereon, varies in accordance with the abrasive contact, thereby establishing a corrective action. Consequently the improved brush when utilized with an out-of-round commutator will restore a substantially round profile and when utilized with a round commutator will tend to maintain it round.

To ensure the desired selective abrasive wear that characterizes the present invention, a concave contact surface roughly conforming to the commutator curvature should be performed in the brush as previously described. If its contact surface were flat, when utilized in a dynmoelectric machine the brush would be more sensitive to pressure variations due to acceleration forces as the brush rides over the crests and valleys of the commutator surface, which sensitivity tends to cause eccentric movement of the brush and can result in untoward electric arching and erosion of the commutator surface as well as chattering and breakage of the brush before the brush contact surface wears sufficiently to conform to the average curvature of the commutator.

In operation the central abrasive portion 23 of the brush contact surface 19 will selectively enage any high spots on the commutator surface and remove copper therefrom at a rate faster than the rate of electrical erosion that usually occurs. Yet mechanical erosion does not exceed practical limits due to the relatively narrow span of the contact surface 19 occupied by the central portion 23. The thickness of the abrasive wafer 22, measured between leading and trailing edges of the brush, is in the range of one sixty-fourth inch to one-fourth inch, preferably approximately one-eighth inch. This dimension and the particular abrasive content of the element 22 determine the actual rate at which copper is removed from the commutator surface. I estimate that the minimum rate should be approximately 0.001 inch (in a radial direction) for every 25 million revolutions of the commutator. For intermittent use of the subject brush, a maximum rate of mechanical wear of approximately 0.001 inch for every 700,000 revolutions is satisfactory, but for a continuously running brush the maximum rate should be much lower, e.g., approximately 0.001 inch per 10 million revolutions. For the brush illustrated in FIG. 2, assuming the abrasive element is one-eighth inch thick and comprises a 15% mixture of silicon carbide particles of 600-grit size, the copper removal rate will be approximately 0.001 inch per 15 million revolutions.

The invention has been described in terms of use with brushes fed radially with respect to the commutator. It should be noted that such an arrangement allows for two direction operation, for which purpose a brush holder having the feature disclosed in U.S. Pat. No. 3,471,732 or 3,526,797 is particularly advantageous.

Figure 7:
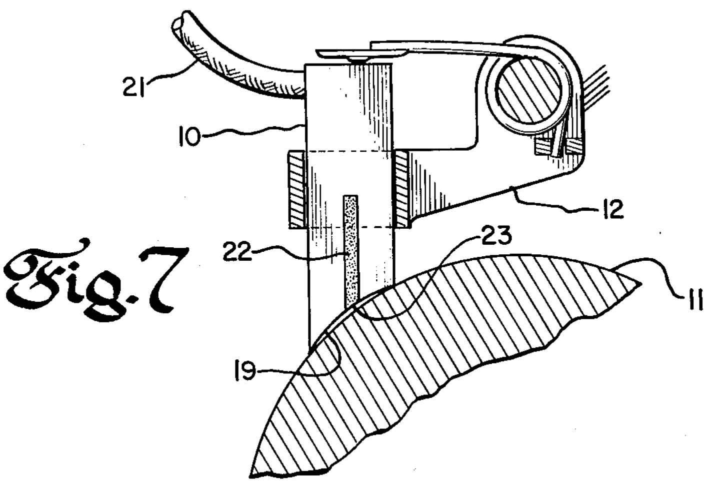
FIG. 7 shows a brush form similar to that of FIGS. 1 and 2 wherein the axis and feed direction of the brush are non-radial with respect to the commutator.

The invention may just as well be applied to a brush positioned at an angle to the radius of the commutator, as shown in FIG. 7. The abrasive wafer 22 is longitudinally disposed in the brush body 18, which is biased in a longitudinal direction by the brushholder 12 to engage the commutator 11 at the contact surface 19.

While several forms of the invention have been shown and described by way of illustration, other modifications will undoubtedly occur to those skilled in the art. I therefore contemplate by the claims that conclude this specification to cover all such modifications as fall within the true spirit and scope of this invention.

What I claim and new and desire to secure by Letters Patent of the United States is:

1. An improved electrically conductive brush of the type used in dynamoelectric machinery including a rotated part, such as a commutator or a slip ring, said part comprising electroconductive material such as copper, having an exposed convex surface and said machinery further including means for holding the brush and for biasing a contact surface thereof toward said exposed surface to provide an electric current conducting, sliding contact between the brush and the rotated part, wherein the improvement comprises an abrasive element longitudinally interposed in said brush, said element having one end extending across and forming a central portion of said contact surface, which portion has a relatively small area and is disposed generally parallel to and midway between leading and trailing edges of said brush, said contact surface being so arranged that with said brush continuously in contact with said rotated part the central portion of said contact surface will frictionally engage high spots of said exposed surface where the exposed surface has a radius of curvature less than its average radius of curvature but will not engage low spots of said exposed surface where the radius of curvature is greater than average, said element having such dimensions and abrasive content that in operation it removes electroconductive material from said exposed surface of the rotated part at a rate faster than the rate of electrical erosion of said material, whereby the improved brush when utilized in said machinery will cause selective abrasive wear of any high spots on said exposed surface and thus restore and maintain a substantially round profile on said rotated part.

2. A brush as set forth in claim 1 wherein the minimum rate at which said element in operation removes electroconductive material from said exposed surface is approximately 0.001 inch (in a radial direction) for every 25 million revolutions of said rotated part.

3. A brush as set forth in claim 2 wherein the maximum rate at which said element in operation removes electroconductive material from said exposed surface is approximately 0.001 inch (in a radial direction) for every 700,000 revolutions of said rotated part.

4. A brush as set forth in claim 1 wherein said element in operation removed electroconductive material from said exposed surface at a rate of approximately 0.001 inch (in a radial direction for every 15 million revolutions.

5. A brush as set forth in claim 1 wherein said abrasive element comprises a mixture of a carbonaceous material and hard non-conducting particles, the percentage of non-conducting particles in said mixture being approximately 15%.

6. A brush as set forth in claim 5 wherein the size of said non-conducting particles is approximately 600 grit.

7. A brush as set forth in claim 1 wherein said abrasive element comprises a mixture of carbonaceous material and hard non-conducting particles, the size of said non-conducting particles being approximately 600 grit.

8. A brush as set forth in claim 1 wherein the relatively small area of the central portion of said contact surface is less than approximately 40 per cent of the total area of said contact surface.

9. A brush as set forth in claim 8 wherein the thickness of said abrasive element, measured between leading and trailing edges of the brush, is in the range of one sixth-fourth inch to one-fourth inch.

10. A brush as set forth in claim 9 wherein said abrasive element has a thickness of approximately one-eighth inch and comprises a mixture of a carbonaceous material and hard non-conducting particles, the percentage of particles in said mixture being approximately 15% and the size of the particles being approximately 600 grit.

11. A brush as set forth in claim 1 wherein the length of said abrasive element is less than the total length of the brush, thereby providing during normal wear of the brush when utilized in said machinery a region wherein said contact surface is free of said abrasive element.

12. A brush as set forth in claim 1 and formed by securing said abrasive element between two parallel carbonaceous wafers.

13. An improved brush as set forth in claim 1 wherein the improvement further comprises the contact surface of said brush being made concave prior to utilization in dynamoelectric machinery.

14. A brush as set forth in claim 13 wherein said concave contact surface has a radius of curvature approximately the same as or slightly less than the average radius of curvature of the exposed surface of the rotated part of the machinery in which said brush will be utilized.

15. An improved electrically conductive brush of the type used in dynamoelectric machinery including a rotated part, such as a commutator or a slip ring, said part comprising electroconductive material, such as copper, having an exposed convex surface and said machinery further including means for holding the brush and for biasing a contact surface thereof toward said exposed surface to provide an electric current conducting, sliding contact between the brush and the rotated part, wherein the improvement comprises an abrasive element longitudinally interposed in said brush, said element having one end extending across and forming a central portion of said contact surface, which portion has a relatively small area and is disposed generally parallel to and midway between leading and trailing edges of said brush, said contact surface having a concave profile prior to utilization of said brush in said dynamoelectric machinery so that its central portion will frictionally engage high spots of said exposed surface where the exposed surface has a radius of curvature less than the radius of curvature of the brush contact surface but will not engage low spots of said exposed surface where the radius of curvature is greater than of said brush contact surface, whereby the improved brush when utilized in said machinery will cause selective abrasive wear of any high spots on said exposed surface and thus restore and maintain a substantially round profile on said rotated part.

16. A brush as set forth in claim 15 wherein said concave brush contact surface has a radius of curvature approximately the same as or slightly less than the average radius of curvature of the exposed surface of the rotated part of the machinery in which said brush will be utilized.

17. A brush as set forth in claim 15 wherein said concave contact surface is formed by a grinding process.

18. A brush as set forth in claim 15 wherein said concave contact surface is formed by a sanding process.

19. A brush as set forth in claim 15 for use in dynamoelectric machinery including means for holding and feeding the brush radially with respect to said rotated part.

* * * * *

UNITED STATES PATENT OFFICE

CERTIFICATE OF CORRECTION

PATENT NO. : 4,034,249

DATED : July 5, 1977

INVENTOR(S) : Ralph W. Avery

It is certified that error appears in the above-identified patent and that said Letters Patent are hereby corrected as shown below:

Column 1, line 67, delete "of" (second occurrence) and substitute -- or --

Column 6, line 43, delete "and" (first occurrence) and substitute -- as --

Column 6, line 48, insert "," after "material"

Column 7, line 23, insert ")" after "direction"

Column 7, line 45, delete "sixth-fourth" and substitute -- sixty-fourth --

Column 8, line 37, insert "that" between "than" and "of"

Signed and Sealed this

*First* Day of *November 1977*

[SEAL]

*Attest:*

RUTH C. MASON
*Attesting Officer*

LUTRELLE F. PARKER
*Acting Commissioner of Patents and Trademarks*